US008656829B2

(12) United States Patent
Ciaciura

(10) Patent No.: US 8,656,829 B2
(45) Date of Patent: Feb. 25, 2014

(54) FLIPPING GRILLING GRATE

(76) Inventor: Robert J. Ciaciura, Johns Creek, GA (US)

( * ) Notice: Subject to any disclaimer, the term of this patent is extended or adjusted under 35 U.S.C. 154(b) by 203 days.

(21) Appl. No.: 13/239,906

(22) Filed: Sep. 22, 2011

(65) Prior Publication Data

US 2013/0074705 A1 Mar. 28, 2013

(51) Int. Cl.
*A47J 37/04* (2006.01)
*A47J 37/07* (2006.01)

(52) U.S. Cl.
USPC .................. 99/398; 99/397; 99/395; 99/427; 99/449; 99/450

(58) Field of Classification Search
USPC ........... 99/397, 395, 396, 398, 394, 449, 450, 99/427, 426; 126/15 R, 25 R, 9 R, 9 B
See application file for complete search history.

(56) References Cited

U.S. PATENT DOCUMENTS

| | | | | |
|---|---|---|---|---|
| 2,918,218 | A | 5/1961 | Persinger et al. | |
| 3,599,624 | A * | 8/1971 | Gehring | 126/15 R |
| 3,704,141 | A * | 11/1972 | Grossman | 99/397 |
| 5,048,882 | A | 9/1991 | Fielding et al. | |
| 5,782,224 | A * | 7/1998 | Rabell | 126/25 R |
| 7,717,029 | B2 | 5/2010 | Rowe et al. | |
| 2004/0031478 | A1 | 2/2004 | Gifford | |

* cited by examiner

*Primary Examiner* — Reginald L Alexander
(74) *Attorney, Agent, or Firm* — Welsh Flaxman & Gitler LLC

(57) ABSTRACT

A flipping grilling grate includes a primary grate member with a food contact surface and four pivot posts formed in diametrically opposed pairs. The grilling grate also includes a secondary grate member with a food contact surface 7and four pivot post formed in diametrically opposed pairs. A first pair of opposed pivot posts on the primary grate member mate with a first pair of opposed pivot posts on the secondary grate member and a second pair of opposed pivot posts on the primary grate member mate with a second pair of opposed pivot posts on the secondary grate member when the primary and secondary grate members are assembled together.

19 Claims, 5 Drawing Sheets

FLIPPING GRILLING GRATE

BACKGROUND OF THE INVENTION

1. Field of the Invention

The present invention relates a grilling accessory. More particularly, the present invention relates to a grilling grate which flips over when lifted.

2. Description of the Related Art

There are a number of accessories to make the grilling experience easier and more enjoyable. Accessories include utensils, starters, rotisseries, lights, meat thermometers, brushes, griddles, racks and baskets. Cooking baskets generally come with a handle extending from one side thereof for flipping. The handle, however, prevents the grill cover from closing completely. The single handle design makes it cumbersome for flipping and can only manage approximately 3-lbs of food. Finally, these cooking baskets provide no stage presence for the basket.

In fact, others have attempted to develop grilling accessories which enclose the food being cooked. For example, U.S. Pat. No. 5,048,882 to Fielding et al. shows a basket with a removable handle. Although the handle can be detached, it must be reattached and then manually rotated in order to flip the food being cooked. The attachment and detachment of the handle over a hot grill is time consuming and results in undesirable grill cooling as the food is being turned over. Further, it is difficult to rotate the handle once it is attached to the basket, because the weight all resides at one end thereof. Also, attachment of the handle is difficult if the grilling surface is not at the same level as the edge of the grill housing itself, which is the case with one of the most common grills on the market, that is the kettle grill.

U.S. Pat. No. 7,717,029 to Rowe et al. shows another attempt to provide a grill assembly for enclosing food in a manner permitting the food to be turned over during the cooking process. However, if the grilling surface is not at the same level as the edge of the grill housing itself, it is difficult to attach the handle needed for rotating. Additionally, rotation of the grill assembly requires the user to cross his arms. This has also been found to be very awkward.

Other devices, such as disclosed in U.S. Pat. Nos. 2,983,218 to Persinger et al. and 5,782,224 to Rabell, have gone so far as reengineering the grill itself to allow for the flipping of food enclosed between two grates.

Lastly, U.S. Patent Application Publication No. 2004/0031478 to Gifford shows a rotatable grill assembly requiring an adapter be added to the grill in order to accommodate the rotatable racks.

The present grate has been developed to overcome the shortcomings in grilling accessories currently offered. The present grate achieves this by providing a grilling grate having a surface area of up to 254 square inches and takes up the majority of a conventional 22½ inch diameter charcoal kettle grill. The pivot technology employed in accordance with the present invention allows for easy and effortless flipping, which does not require manual rotation of the grilling accessory. Still further, since there are no handles attached during cooking, the grill cover can close completely allowing the cooking heat to be optimized. Flipping a burger that takes up the majority of a 22½ inch diameter grill has a huge stage presence and generally catches the attention of just about everyone at the backyard BBQ or tailgate and becomes a conversation starter.

SUMMARY OF THE INVENTION

It is, therefore, an object of the present invention to provide a flipping grilling grate. The grilling grate includes a primary grate member with a food contact surface and four pivot posts formed in diametrically opposed pairs. The grilling grate also includes a secondary grate member with a food contact surface and four pivot post formed in diametrically opposed pairs. A first pair of opposed pivot posts on the primary grate member mate with a first pair of opposed pivot posts on the secondary grate member and a second pair of opposed pivot posts on the primary grate member mate with a second pair of opposed pivot posts on the secondary grate member when the primary and secondary grate members are assembled together.

It is also an object of the present invention to provide a grilling grate wherein primary grate member and secondary grate member have circumferences of the same size.

It is another object of the present invention to provide a grilling grate wherein the four pivot posts of the primary grate member are L-shaped with a free end extending in a first direction and the four pivot posts of the secondary grate member are L-shaped with a free end extending in an opposite second direction when the primary grate member and secondary grate member are assembled, thereby forming T-shaped connection members.

It is a further object of the present invention to provide a grilling grate wherein the food contact surface of the primary grate member includes a primary support surface lying in a plane, and first and third pivot posts of the primary grate member lie in the plane in which the primary support surface lies, while second and fourth pivot posts of the primary grate member lie outside of the plane in which the primary support surface lies.

It is also an object of the present invention to provide a grilling grate wherein the food contact surface of the secondary grate member includes a secondary support surface lying in a plane, and first and third pivot posts of the secondary grate member lie outside of the plane in which the secondary support surface lies, while second and fourth pivot posts of the primary grate member lie in the plane in which the secondary support surface lies.

It is another object of the present invention to provide a grilling grate wherein, when the first and second grate members are assembled, the first and third pivot posts of the secondary grate member lie in the plane in which the primary support surface lies, and the second and fourth pivot posts of the primary grate member lie in the plane in which the secondary support surface lies.

It is a further object of the present invention to provide a grilling grate wherein the primary grate member includes a primary side wall extending around half of the circumference of the primary grate member and the secondary grate member includes a secondary side wall extending around half of the circumference of the secondary grate member.

It is also an object of the present invention to provide a grilling grate wherein the primary side wall of the primary grate member is oriented perpendicular to the food contact surface and the secondary side wall of the secondary grate member is oriented perpendicular to the food contact surface.

It is another object of the present invention to provide a grilling grate wherein the four pivot posts of the primary grate member are disposed 90 degrees from one another about the circumference of the primary grate member and the four pivot posts of the secondary grate member are disposed 90 degrees from one another about the circumference of the secondary grate member.

It is a further object of the present invention to provide a grilling grate wherein the four pivot posts of the primary grate member are L-shaped with a free end extending in a first direction and the four pivot posts of the secondary grate member are L-shaped with a free end extending in an opposite second direction when the primary grate member and secondary grate member are assembled.

It is also an object of the present invention to provide a grilling grate including a pair of pivot handles having an end shaped and dimensioned for engaging the pivot posts of both the primary grate member and the secondary grate member.

It is another object of the present invention to provide a grilling grate wherein the pivot handles include an elongated section and a generally oval ring with a semicircular portion opposite the elongated section on a long leg of the oval ring at the end of the elongated section.

It is a further object of the present invention to provide a grilling grate including a pair of pivot handles having an end shaped and dimensioned for engaging the T-shaped connection members formed by mating pivot posts of both the primary grate member and the secondary grate member.

It is also an object of the present invention to provide a grilling grate including indicia tabs on the primary grate member and secondary grate member located on the opposite side from the food contact surfaces directly below pivot posts.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

In accordance with the present invention, and with reference to FIGS. 1 to 7, a grilling accessory is disclosed. The grilling accessory is a flipping grilling grate 10 and associated flipping or pivot, handles 40. It is appreciated the flipping grilling grate may be shaped, dimensioned and engineered for a variety of grilling environments.

Briefly, and as disclosed in detail below, the present flipping grilling grate 10 is a two piece rotating grate assembly, which when assembled forms a cage or enclosure for grilling food. The flipping grilling grate 10 is smaller in diameter than the grill that the flipping grilling grate 10 is going to be used in combination with when cooking the food enclosed in the flipping grilling grate 10.

Figure 1:
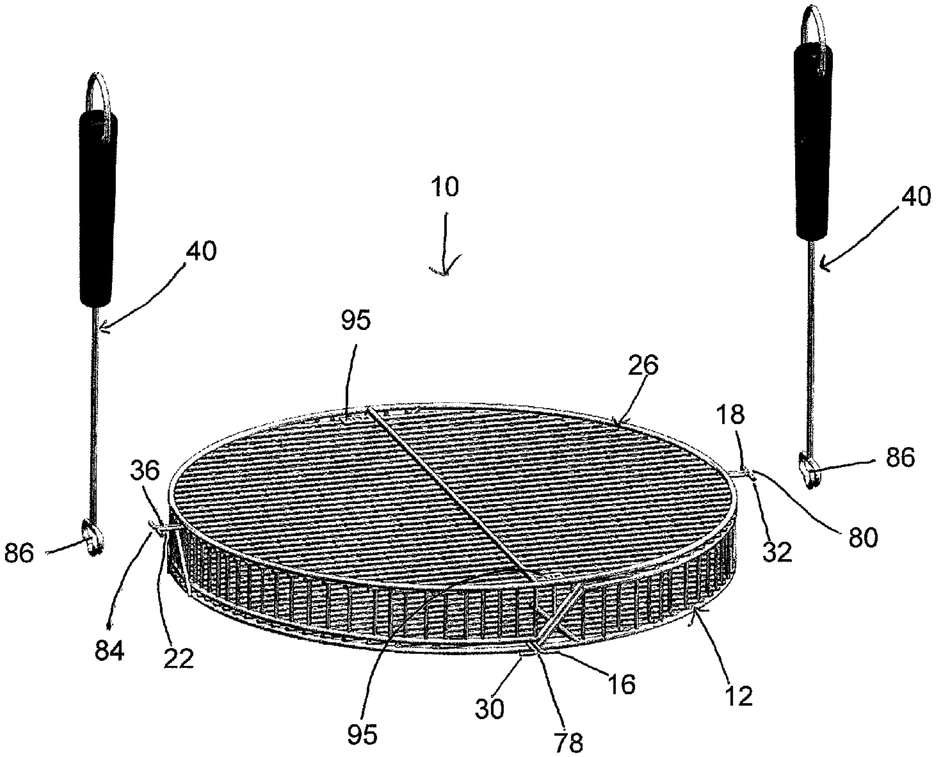
FIG. 1 is a perspective view of the flipping grilling grate of the present invention with the handles about to be attached.

More specifically, and with reference to FIG. 1 the flipping grilling grate 10 has a lower primary grate member 12 (also referred to as the restraining grate), an upper secondary grate member 26 (also referred to as the sliding grate) and a pair of flipping handles 40.

The lower primary grate 12 includes a food contact surface 14 and four pivot posts 16, 18, 20, 22 disposed 90 degrees from one another about the perimeter of the lower primary grate member 12. While disclosed as being 90 degrees from one another, it is appreciated other locations are possible so long as pivot post 16 and 20 are opposed from each other and pivot post 18 and 22 are opposed from each other. The lower primary grate member 12 also includes a primary side wall 24, which may contact food as it is supported by the grilling grate 10, extending around half of the circumference of the primary grate member 12, perpendicular to the food contact surface 14.

Further, the present rotating grilling grate 10 includes an upper secondary grate member 26 with a food contact surface 28 and four pivot posts 30, 32, 34, 36 disposed 90 degrees from one another about the perimeter of the secondary grate member 26. Once again, while disclosed as being 90 degrees from one another, it is appreciated other locations are possible as long as pivot post 30 and 34 are diametrically opposed from each other and pivot post 32 and 36 are diametrically opposed from each other. The upper secondary grate member 26 also includes a secondary side wall 38, which may contact food as it is supported by the grilling grate 10, extending around half of the perimeter of the secondary grate member 26, perpendicular to the food contact surface 28.

When assembled, the primary side wall 24 of the primary grate member 12 opposes the secondary side wall 38 of the secondary grate member 26 with the respective side walls 24, 38 of the primary and secondary grate members 12, 26 and the food contact surfaces 14, 28 of the primary and secondary grate members 12, 26 forming an enclosure for the food to be grilled. Further, the four pivot posts 16, 18, 20, 22 on the primary grate member 12 and the four pivot posts 30, 32, 34, 36 on the secondary grate member 26 mate to form opposed pairs of upper pivot posts 18, 22 on the primary grate member 12 and opposed pairs of upper pivot posts 32, 36 on the secondary grate member 26 as well as opposed pairs of lower pivot posts 16, 20 on the primary grate member 12 and opposed pairs of lower pivot posts 30, 34 on the secondary grate member 26.

In operation, food to be grilled is placed or slid on the secondary grate member 26 and covered by the primary grate member 12. The primary and secondary grate members 12, 26 are then secured to one another. To start the process a burger is prepared on a sheet of tin foil. The tin foil and burger are then slid onto the sliding or secondary grate member 26. The sliding or secondary grate member 26 is then covered by the restraining or primary grate member 12 and the assembled flipping grilling grate 10 is flipped over. With the sliding or secondary grate member 26 now on top, the secondary grate member 26 can be removed so that the tin foil can be removed from what is now the top of the burger. When fully cooked, the burger is also slid off of the sliding or secondary grate member 26, hence the name sliding grate. Once it is desired to flip the assembled flipping grilling grate 10 during cooking, a pair of pivot handles 40 as discussed below are placed over the lower mating pivot post 16, 20 of the primary grate member 12 and the lower mating pivot posts 30, 34 of the secondary grate member 26 and the rotating grilling grate 10 is lifted. Due to the positioning of the mating pivot posts 16, 20, 30, 34 beneath the food and the uneven distribution of weight of the food being cooked, the assembled rotating grilling grate 10 will flip. It is appreciated the grilling grate itself may be constructed with a built-in imbalance ensuring flipping will occur as desired.

The present grilling grate 10 is especially well suited for grilling the Big flipping Burger (BfB), an 18 inch diameter 10-lb burger stuffed with the griller's favorite ingredients (cheese, bacon and onion) and able to feed 25 people at a single serving. The present grilling grate 10 has an enormous presence that occupies a majority of the grilling space and includes technology allowing the cage to be efficiently flipped in the air and set back down on the grill. The present grilling grate 10 is designed for a 21 inch diameter round grill or larger. Because there are no handles attached to the grilling grate 10, the grill cover can be completely closed maximizing even cooking temperature.

The present grilling grate 10 provides customers a new and innovative grate offering entertainment and fun for both the griller and the griller's guests. The present grilling grate 10 achieves this goal by providing a grilling accessory that can be used in grilling a variety of foods. The recipes applicable to the present grilling grate 10 include the Big flipping Burger (discussed above) that can be made with beef, turkey, pork, chicken and bison. Other recipes include the Big flipping Veggies for plain, marinated and seasoned vegetables.

As briefly mentioned above, the present grilling grate 10 includes a lower primary grate member 12 with a food contact surface 14 and four pivot posts 16, 18, 20, 22 disposed 90 degrees from one another about the perimeter of the lower primary grate member 12. The food contact surface 14 is composed of a flat, circular primary support member 42 forming a primary support surface. The primary support member 42 is preferably constructed of stainless or heavy plated steel in a manner similar to a traditional grill grate and includes a circumferential frame member 44 with a single diametric support member 46 extending from one edge thereof to another edge thereof and through the center of circumferential frame member 44. A plurality of elongated frame members 48 extending perpendicular to the diametric support member 46 are spaced in a relatively close configuration to define a supporting surface through which small objects may not pass. Additional diametric support members may be included on opposite sides of the center diametric support member 46.

The lower primary grate member 12 also includes a primary side wall 24 secured along the outer circumference of the primary support member 42. The primary side wall 24 extends around half of the perimeter of the primary support member 42. The primary side wall 24 is oriented so as to extend perpendicular to the plane in which the primary support member 42 lies. That is, the primary side wall 24 includes a bottom edge 50 secured to the primary support member 42 along the outer circumference thereof and an upper edge 51 spaced from the bottom edge 50, wherein an axis defining the shortest distance from the bottom edge 50 to the upper edge 51 is perpendicular to the plane in which the primary support member 42 lies. The primary side wall 24 includes a plurality of supporting frame members 54 extending between primary support member 42 and an upper support member 52, thereby creating an enclosing structure similar to that of the primary support member 42.

Figure 2:
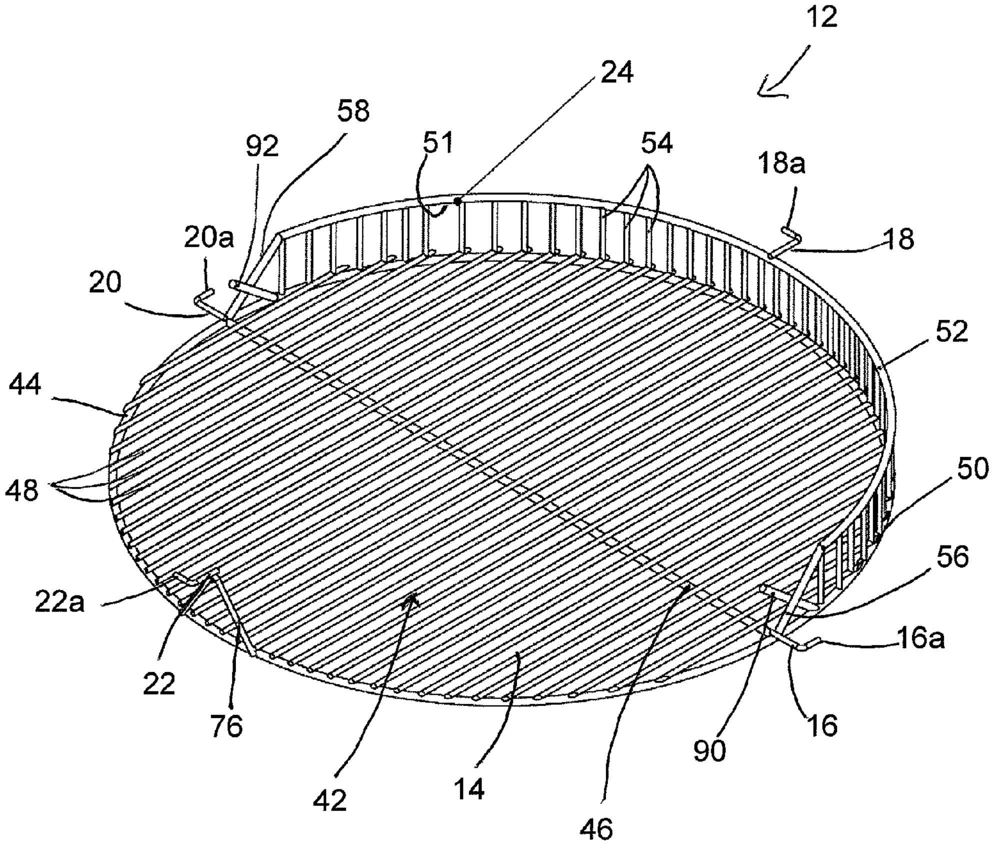
FIG. 2 is a perspective view of the lower primary grate.

As briefly mentioned above, the primary grate member 12 as shown includes four pivot posts 16, 18, 20, 22 disposed 90 degrees from one another about the perimeter of the lower primary grate member 12. The pivot posts 16, 18, 20, 22 are each L-shaped, with the free leg 16*a*, 18*a*, 20*a*, 22*a* extending opposite the direction of the free legs 30*a*, 32*a*, 34*a*, 36*a* of the pivot posts 30, 32, 34, 36 of the secondary grate member 26 with which they mate when the grilling grate 10 is fully assembled. in a clockwise direction when the primary grate member 12 is viewed from above as shown in FIG. 2. However, and as will be appreciated based upon the following disclosure, the four pivot posts 16, 18, 20, 22 are positioned at different locations relative to the plane in which the primary support member 42 lies. In particular, first and third pivot posts 16, 20 are positioned so as to lie in the same plane in which the primary support member 42 lies. The first and third pivot posts 16, 20 are positioned adjacent the ends 56, 58 of the primary side wall 24 as it extends about the circumference of the primary support member 42. The second and fourth pivot posts 18, 22 are positioned such that they sit above the plane in which the primary support member 42 lies. The second pivot post 18 is secured to the upper support member 52 of the primary side wall 24 while the fourth pivot post 22 extends from a V-restrainer 76 secured along the circumference of the primary support member 42. The second and fourth pivot posts 18, 22 are positioned such that they substantially lie in the same plane in which the secondary support member 60 of the secondary grate member 26 lies.

The rotating grilling grate 10 includes an upper secondary grate member 26 with a food contact surface 28 and four pivot posts 30, 32, 34 36 disposed 90 degrees from one another about the perimeter of the secondary grate member 26. As with the primary grate member 12, the food contact surface 28 of the secondary grate member 26 is composed of a flat, circular secondary support member 60 forming a secondary support surface. The secondary support member 60 is preferably constructed of stainless or heavy plated steel in a manner similar to a traditional grill grate and includes a circumferential frame member 62 with a single diametric support member 63 extending from one edge thereof to another edge thereof and through the center of circumferential frame member 62. A plurality of elongated frame members 64 extending perpendicular to the diametric support member 63 are spaced in a relatively close configuration to define a supporting surface through which small objects may not pass. Additional diametric support members may be included on opposite sides of the center diametric support member 63.

The upper secondary grate member 26 also includes a secondary side wall 38 secured along the outer circumference of the secondary support member 60. The secondary side wall 38 extends around half of the perimeter of the secondary support member 60. The secondary side wall 38 is oriented so as to extend perpendicular to the plane in which the secondary support member 60 lies. That is, the secondary side wall 38 includes a bottom edge 66 secured to the secondary support member 60 along the outer circumference thereof and an upper edge 69 spaced from the bottom edge 66, wherein an axis defining the shortest distance from the bottom edge 66 to the upper edge 69 is perpendicular to the plane in which the secondary support member 60 lies. The secondary side wall 38 includes a plurality of spaced supporting frame members 70 extending between the secondary support member 60 and secondary upper support member 68, thereby creating an enclosing structure similar to that of the secondary support member 60.

As briefly mentioned above, the upper secondary grate member 26 includes four pivot posts 30, 32, 34 36 disposed 90 degrees from one another about the perimeter of the upper secondary grate member 26. The pivot posts 30, 32, 34 36 are each L-shaped, with the free leg 30*a*, 32*a*, 34*a*, 36*a* extending in a directions opposite the direction of the free legs 16*a*, 18*a*, 20*a*, 22*a* of the pivot posts 16, 18, 20, 22 of the primary grate member 12 with which they mate when the grilling grate is fully assembled. It is noted that the free legs 30*a*, 32*a*, 34*a*, 36*a* could extend in various directions as long as the free legs 16*a*, 18*a*, 20*a* and 22*a* also extend in a respective opposite direction.

As will be appreciated based upon the following disclosure, the four pivot posts 30, 32, 34, 36 are positioned at different locations relative to the plane in which the secondary support member 60 lies. In particular, second and fourth pivot posts 32, 36 are positioned so as to lie in the same plane in which the secondary support member 60 lies. The second grate member 32 extends from a central position along the arc of the secondary side wall 38 and the fourth pivot post 36 extends from the circumferential frame member 62 at a position diametrically opposed to the second pivot post 32. The first and third pivot posts 30, 34 are positioned such that they sit below the plane in which the secondary support member 60 lies and extend from the upper edge 69 of the secondary side wall 38. The first and third pivot posts 30, 34 are positioned adjacent the ends 72, 74 of the secondary side wall 38 as it extends about the circumference of the secondary support member 60.

As briefly mentioned above, the lower primary grate member 12 also includes a primary V-restrainer 76 that holds the secondary grate member 26 in place and allows the fourth pivot post 22 on top of the V-restrainer 76 to mirror the fourth pivot post 36 from the secondary grate member 26. The lower primary grate member 12 is also provided with two secondary restrainers 90, 92 used to hold the secondary grate member 26 from sliding side to side when the flipping grilling grate 10 is flipping and being set back down on the grill. As such when assembled the primary grate member function as a restraining grate to position and hold the secondary grate member 26 by contacting the exterior of side wall 38 as best shown in FIG. 1.

Referring to FIG. 1, the assembly of the present flipping grilling grate 10 is shown. FIG. 1 shows how the primary grate member 12 and secondary grate member 26 come together. In particular, the secondary grate member 26 is set on top of the primary grate member 12 with the respective first, second, third, and fourth pivot posts 16, 18, 20, 22, 30, 32, 34, 36 substantially aligned with the free legs 16*a*, 18*a*, 20*a*, 22*a*, 30*a*, 32*a*, 34*a*, 36*a* thereof extending in opposite directions defining T-shaped connection members 78, 80, 82, 84, the use of which will be discussed below in greater detail. With the secondary grate member 26 positioned over the primary grate member 12 and the respective pivot posts 16, 18, 20, 22, 30, 32, 34, 36 aligned, the burger or other food is totally enclosed between the primary grate member 12 and the secondary grate member 26.

Referring to FIG. 1, the primary grate member 12 and secondary grate member 26 are placed together. Also shown are the two pivot handles 40 that are used to flip the present flipping grilling grate 10. When the primary and second grate members 12, 26 are placed together, the four pivot posts 16, 18, 20, 22 on the primary grate member 12 are a mirror image of the four pivot posts 30, 32, 34, 36 on the secondary grate member 26; that is, the pivot posts 16, 30 of their respective primary and secondary grate members 12, 26 are aligned to form T-shaped connection member 78, the second pivot posts 18, 32 are aligned to form T-shaped connection member 80, the third pivot posts 20, 34 are aligned to form T-shaped connection member 82 and the fourth pivot posts 22, 36 are aligned to form T-shaped connection member 84. The pivot posts 16, 18, 20, 22, 30, 32, 34, 36 are a mirror image of one another and when the primary and second grate members 12, 26 are put together the pivot posts 16, 18, 20, 22, 30, 32, 34, 36 form four T-shaped connection members 78, 80, 82, 84 as discussed above.

So when the primary grate member 12 and secondary grate member 26 are assembled together the result is upper and lower food contact surfaces and two pair of diametrically opposed T-shaped connection members; that is, a first pair of T-shaped connection members 78, 82 and second pair of T-shaped connection members 80, 84. Once again, each T-shaped connection member 78, 80, 82, 84 is formed from opposed pairs of pivot posts 16, 18, 20, 22, 30, 32, 34, 36. The primary grate member 12 includes two pairs of pivot posts comprised of a first pair of pivot posts 16, 20 and a second pair of pivot posts 18, 22 and the secondary grate member 26 includes two pairs of pivot post comprised of a first pair of pivot posts 30, 34 and a second pair of pivot posts 32, 36. The first pair of pivot posts 16, 20 of the primary grate member 12 mate with the first pair of pivot posts 30, 34 of the secondary grate member 26 and the second pair of pivot posts 18, 22 of the primary grate member 12 mate with the second pair of pivot posts 32, 36 of the secondary grate member 26 when the primary and secondary grate members 12, 26 are assembled together.

Since two sets of the pivot posts 16, 20, 30, 34 are on the bottom of the flipping grilling grate 10, that is, lying within the plane in which the primary support member 42 lies, and the other two sets of pivot posts 18, 22, 34, 36 are on the top of the flipping grilling grate 10, that is, lying within the plane in which the secondary support member 60 lies, an imbalance is created allowing for selective flipping of the flipping grilling grate 10. In practice, the pivot handles 40 slide over whichever T-shaped connection members 78, 80, 82, 84 are positioned beneath the food within the flipping grilling grate 10. As shown in FIG. 1, the pivot handles 40 are just being removed from opposed T-shaped connection members 80, 84 and when it is time to flip the flipping grilling grate 10 again the pivot handles 40 would be slid onto opposed T-shaped connection members 78, 82.

Figure 3:
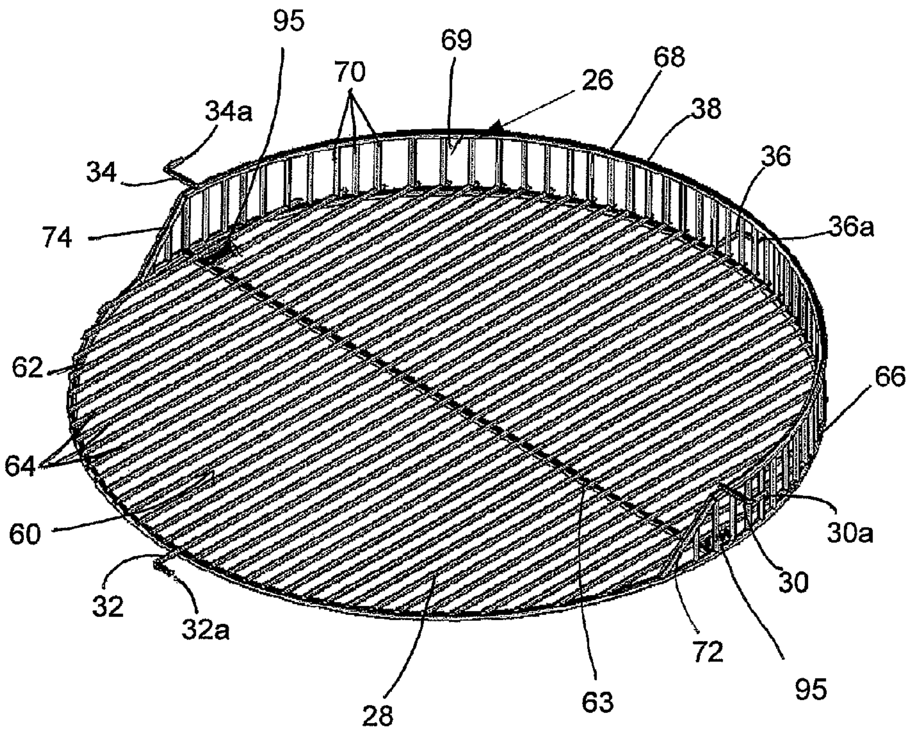
FIG. 3 is a perspective view of the upper secondary grate.
Figure 5:
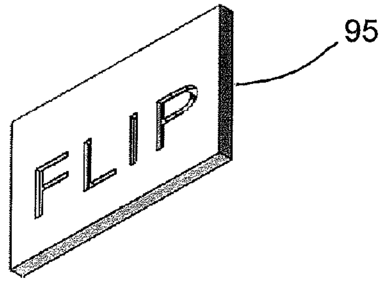
FIG. 5 is a perspective view of an indicia tab.
Figure 6:
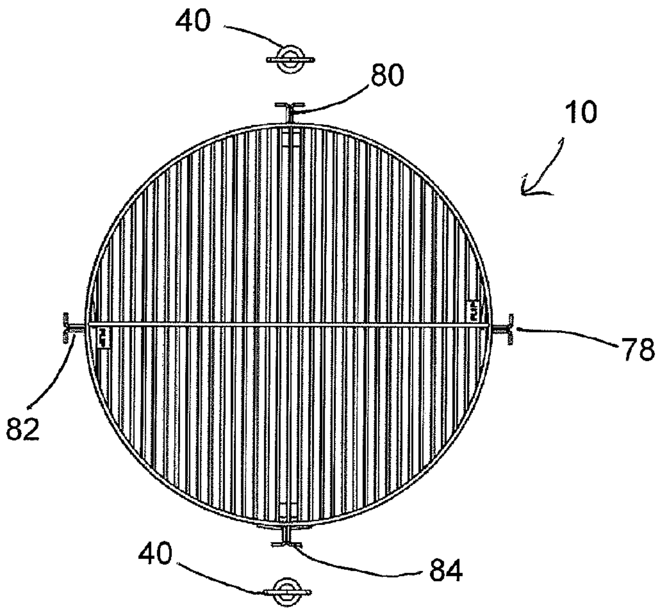
FIG. 6 is a top view of the flipping grilling grate with the flipping handles removed.
Figure 7:
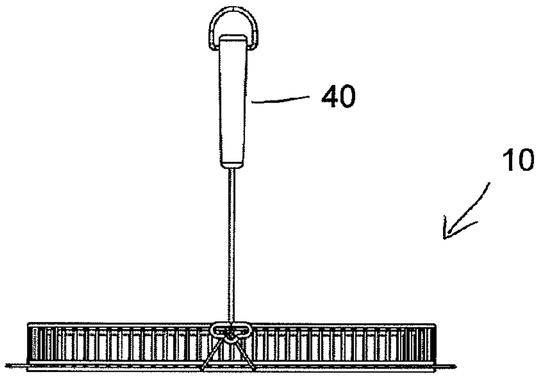
FIG. 7 is a side view of the flipping grilling grate which has just being flipped and the handle still attached.

It is further noted that primary grate member 12 and secondary grate member 26 include indicia tabs 95 which read FLIP, see FIGS. 1 and 5. The indicia tabs 95 on the primary grate member 12 are positioned on the opposite side from the cooking surface, that is, the food contact surface 14, directly below pivot posts 18, 22 and, as shown in FIGS. 1 and 3, are positioned on the secondary grate member 26 on the opposite side from the cooking surface, that is, the food contact surface 28, directly below pivot posts 30 and 34. The indicia tabs 95 are an indicator to the user to place the pivot handles 40 on the lower pivot post located below the tabs 95.

Once the pivot handles are secured to the lower pair of T-shaped connection members, the pivot handles 40 are lifted in the air above the grill, generally between 10 to 12 inches above the grill. Because the T-shaped connection members 78, 80, 82, 84 are beneath the food within the flipping grilling grate 10, the inherent imbalance of the food within the flipping grilling grate 10 causes the flipping grilling grate 10 to automatically flip over because of the positioning of the pivot points, that is, the T-shaped connection members 78, 80, 82, 84, beneath the unbalanced assembly of food supported above the T-shaped connection members 78, 80, 82, 84 by the food contacting surfaces 14, 28 of the grilling grate 10. Once flipped, the present flipping grilling grate 10 is set back down on the grill. What were the bottom T-shaped connection members, that is, pivot posts, used to flip the present grilling grate are now above the food and become the top T-shaped connection members. The other two T-shaped connection members are now down on the bottom so the present grilling grate can be flipped again in the same manner it was flipped the first time.

It is important to note that the primary and secondary grate members 12, 26 are placed together but there are no hinges holding the grates together. The only thing that holds the primary and second grate members 12, 26 together are the pivot handles 40 that have a slot 86 and an indentation 88 that hold the pivot posts together. By not having the primary and secondary grate members 12, 26 locked together the pivot handles 40 can be used to lift the top grate for entry of a spatula to be slid over the food in case the food is sticking to the upper grate of the flipping grilling grate 10.

Figure 4:
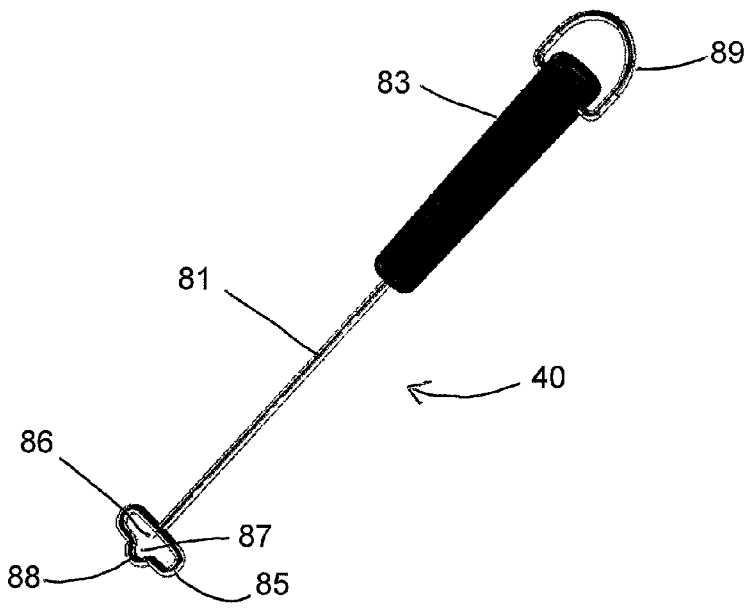
FIG. 4 is a perspective view of a flipping handle.

FIG. 4 shows a close-up of the pivot handles 40. Each of pivot handle 40 is comprised of an insulated gripping section 83 and an elongated section 81 extending from the gripping section 83. The elongated section terminates in a generally oval ring 85 with a semicircular portion 88 opposite the elongated section 81 on a long leg of the oval ring. The elongated section 81 and ring 85 are preferably made from a coated metal, such as heavy plated steel. The pivot handles 40 may also include an optional hanging loop 89.

Notice that at the bottom of the pivot handles 40 the ring 85 functions to form a thin slot 86 with a semicircle 87 on one side thereof. The slot 86 is designed to slide over the T-shaped connection members 78, 80, 82, 84. The semicircle 87 is important because it cradles the pivot posts 16, 18, 20, 22, 30, 32, 34, 36 and allows the pivot post to rotate therein, thus allowing for rotation of the flipping grilling grate 10. The ring 85 functions to keep the pivot posts 16, 18, 20, 22, 30, 32, 34, 36 together and therefore will keep the primary grate member 12 and secondary grate member 26 connected together during flipping.

Although a circular flipping grilling grate is disclosed above in accordance with a preferred embodiment of the present invention, it is appreciated the present grate may be manufactured in various sizes and shapes. For example, it is contemplated the grate may be constructed as a circular grate 18 inches in diameter that is designed for use in conjunction with round grills 21 inches in diameter or larger; a circular grate 12 inches in diameter that is designed for use with round grills 14 inches in diameter or larger; a rectangular grate 21 inches long and 12 inches wide that is designed for use with rectangular grills 25 inches long and 15 inches wide or larger; and a square 12 inch grate that is designed for use with square grills 14 inches long and 14 inches wide and larger. Two square 12 inch grates could be used on a grill that is 28 inches long and 15 inches wide and lager and will allow for different food to be grilled at the same time. Each of these grates comes with the primary grate and secondary grate with pivot post technology as discussed above in detail.

The present grate also is packaged for sale with laminated cooking directions, DVD demonstration video and owner's manual with cooking recipes. Finally there will be a transit case to transport the flipping grilling grate and associated accessories.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A flipping grilling grate, comprising:

a primary grate member with a food contact surface and four pivot posts formed in opposed pairs; and a secondary grate member with a food contact surface and four pivot posts formed in opposed pairs;

wherein a first pair of opposed pivot posts on the primary grate member mate with a first pair of opposed pivot posts on the secondary grate member and a second pair of opposed pivot posts on the primary grate member mate with a second pair of opposed pivot posts on the secondary grate member when the primary and secondary grate members are assembled together; and wherein the primary grate member and the secondary grate member have circumferences of the same size and the primary grate member includes a primary side wall extending around half of the circumference of the primary grate member and the secondary grate member includes a secondary side wall extending around half of the circumference of the secondary grate member.

2. The flipping grilling grate according to claim 1, wherein the primary side wall of the primary grate member is oriented perpendicular to the food contact surface and the secondary side wall of the secondary grate member is oriented perpendicular to the food contact surface.

3. The flipping grilling grate according to claim 2, wherein the four pivot posts of the primary grate member are disposed 90 degrees from one another about the circumference of the primary grate member and the four pivot posts of the secondary grate member are disposed 90 degrees from one another about the circumference of the secondary grate member.

4. The flipping grilling grate according to claim 3, wherein the four pivot posts of the primary grate member are L-shaped with a free end extending in a first direction and the four pivot posts of the secondary grate member are L-shaped with a free end extending in an opposite second direction when the primary grate member and the secondary grate member are assembled.

5. The flipping grilling grate according to claim 3, wherein the food contact surface of the primary grate member includes a primary support surface lying in a plane, and first and third pivot posts of the primary grate member lie in the plane in which the primary support surface lies, while second and fourth pivot posts of the primary grate member lie outside of the plane in which the primary support surface lies.

6. The flipping grilling grate according to claim 5, wherein the food contact surface of the secondary grate member includes a secondary support surface lying in a plane, and the first and third pivot posts of the secondary grate member lie outside of the plane in which the secondary support surface lies, while the second and fourth pivot posts of the primary grate member lie in the plane in which the secondary support surface lies.

7. The flipping grilling grate according to claim 6, wherein, when the first and second grate members are assembled, the first and third pivot posts of the secondary grate member lie in the plane in which the primary support surface lies, and the second and fourth pivot posts of the primary grate member lie in the plane in which the secondary support surface lies.

8. A flipping grilling grate, comprising:

a primary grate member with a food contact surface and four pivot posts formed in opposed pairs; and a secondary grate member with a food contact surface and four pivot post formed in opposed pairs; and wherein a first pair of opposed pivot posts on the primary grate member mate with a first pair of opposed pivot posts on the secondary grate member and a second pair of opposed pivot posts on the primary grate member mate with a second pair of opposed pivot posts on the secondary grate member when the primary and secondary grate members are assembled together; and the primary grate member also includes a restrainer that holds the secondary grate member in place when the primary and secondary grate members are assembled together and supports a pivot post of the primary grate member for mating with pivot post of the secondary grate member.

9. The flipping grilling grate according to claim 8, wherein the primary grate member and the secondary grate member have circumferences of the same size.

10. The grilling grate according to claim 9, further including indicia tabs on the primary grate member and the secondary grate member located on the opposite side from the food contact surfaces directly below pivot posts.

11. A flipping grilling grate, comprising:

a primary grate member with a food contact surface and four pivot posts formed in opposed pairs; and a secondary grate member with a food contact surface and four pivot post formed in opposed pairs;

wherein a first pair of opposed pivot posts on the primary grate member mate with a first pair of opposed pivot posts on the secondary grate member and a second pair of opposed pivot posts on the primary grate member mate with a second pair of opposed pivot posts on the secondary grate member when the primary and secondary grate members are assembled together; and a pair of pivot handles having an end shaped and dimensioned for engaging the pivot posts of both the primary grate member and the secondary grate member.

12. The grilling grate according to claim 11, wherein each of the pair of pivot handles include an elongated section and a generally oval ring with a semicircular portion opposite the elongated section on a long leg of the oval ring at the end of the elongated section.

13. A flipping grilling grate, comprising:

a primary grate member with a food contact surface and four pivot posts formed in opposed pairs; and a secondary grate member with a food contact surface and four pivot posts formed in opposed pairs; and wherein a first pair of opposed pivot posts on the primary grate member mate with a first pair of opposed pivot posts on the secondary grate member and a second pair of opposed pivot posts on the primary grate member mate with a second pair of opposed pivot posts on the secondary grate member when the primary and secondary grate members are assembled together; and the food contact surface of the primary grate member includes a primary support surface lying in a plane, and first and third pivot posts of the primary grate member lie in the plane in which the primary support surface lies, while second and fourth pivot posts of the primary grate member lie outside of the plane in which the primary support surface lies.

14. The flipping grilling grate according to claim 13, wherein the primary grate member and the secondary grate member have circumferences of the same size.

15. The flipping grilling grate according to claim 13, wherein the four pivot posts of the primary grate member are L-shaped with a free end extending in a first direction and the four pivot posts of the secondary grate member are L-shaped with a free end extending in a opposite second direction when the primary grate member and the secondary grate member are assembled, thereby forming T-shaped connection members.

16. The flipping grilling grate according to claim 13, wherein the food contact surface of the secondary grate member includes a secondary support surface lying in a plane, and the first and third pivot posts of the secondary grate member lie outside of the plane in which the secondary support surface lies, while the second and fourth pivot posts of the primary grate member lie in the plane in which the secondary support surface lies.

17. The flipping grilling grate according to claim 16, wherein, when the first and second grate members are assembled, the first and third pivot posts of the secondary grate member lie in the plane in which the primary support surface lies, and the second and fourth pivot posts of the primary grate member lie in the plane in which the secondary support surface lies.

18. The grilling grate according to claim 15, farther including a pair of pivot handles having an end shaped and dimensioned for engaging the -shaped connection members formed by mating pivot posts of both the primary grate member and the secondary grate member.

19. The grilling grate according to claim 18, wherein each of the pair of pivot handles include an elongated section and a generally oval ring with a semicircular portion opposite the elongated section on a long leg of the oval ring at the end of the elongated section.

* * * * *

UNITED STATES PATENT AND TRADEMARK OFFICE

CERTIFICATE OF CORRECTION

PATENT NO. : 8,656,829 B2
APPLICATION NO. : 13/239906
DATED : February 25, 2014
INVENTOR(S) : Robert J. Ciaciura It is certified that error appears in the above-identified patent and that said Letters Patent is hereby corrected as shown below:

In the Claims

Column 12, line 30, cancel the text beginning with "18. The grilling grate" to and ending "secondary grate member", and insert the following claim:

--18. The grilling grate according to claim 15, further including a pair of pivot handles having an end shaped and dimensioned for engaging the T-shaped connection members formed by mating pivot posts of both the primary grate member and the secondary grate member.--

Signed and Sealed this
Thirteenth Day of May, 2014

Michelle K. Lee

Michelle K. Lee
*Deputy Director of the United States Patent and Trademark Office*